United States Patent
Suzuki (10) Patent No.: US 9,215,341 B2
(45) Date of Patent: Dec. 15, 2015

(54) IMAGE FORMING APPARATUS THAT PERFORMS FUNCTION RESTRICTION, IMAGE FORMATION METHOD, AND RECORDING MEDIUM

(71) Applicant: KYOCERA Document Solutions Inc., Osaka (JP)

(72) Inventor: Atsushi Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/529,151

(22) Filed: Oct. 31, 2014

(65) Prior Publication Data

US 2015/0116757 A1 Apr. 30, 2015

(30) Foreign Application Priority Data

Oct. 31, 2013 (JP) ................................. 2013-227402

(51) Int. Cl.
*G06F 1/04* (2006.01)
*H04N 1/00* (2006.01)
*H04N 1/32* (2006.01)

(52) U.S. Cl.
CPC ......... *H04N 1/00875* (2013.01); *H04N 1/0084* (2013.01); *H04N 1/00307* (2013.01); *H04N 1/00315* (2013.01); *H04N 1/32122* (2013.01); *H04N 2201/0094* (2013.01)

(58) Field of Classification Search
CPC ............ G06F 3/1208; G06F 17/30569; G06F 17/30575; G06F 3/0482; G06F 3/04883; G06F 3/1232; G06F 3/1242; G06F 3/1251; G06F 3/1256; G06F 3/1264; G06F 3/1285; G06F 3/1288

USPC ......... 358/1.15, 1.9, 1.1, 1.18, 1.5, 498, 1.13, 358/1.14, 1.16, 1.2, 1.4, 1.8, 2.1, 301, 3.06, 358/3.09, 3.12, 448, 474, 488, 502, 504, 358/505, 520, 523; 709/201, 203, 217, 220, 709/226, 231
See application file for complete search history.

(56) References Cited

U.S. PATENT DOCUMENTS 8,224,886 B2 * 7/2012 Visalli et al. .................. 709/202
8,526,033 B2 * 9/2013 Kim ............................. 358/1.15

(Continued)

FOREIGN PATENT DOCUMENTS

| JP | 2001-142665 A | 5/2001 |
|---|---|---|
| JP | 2007-042117 A | 2/2007 |
| JP | 2007-148144 A | 6/2007 |

*Primary Examiner* — Negussie Worku
(74) *Attorney, Agent, or Firm* — Hawaii Patent Services; Nathaniel K. Fedde; Kenton N. Fedde (57) ABSTRACT

Provided is an image forming apparatus that can prevent, when brought out from a setting location, outputting inaccurate image data illegally. An image forming apparatus includes an image output device, a communication device, and a master controller. The master controller includes a nonvolatile memory circuit and a CPU that can perform a plurality of processing capabilities. The plurality of storage areas where the nonvolatile memory circuit includes the area that memorizes the image data are provided. The processing capability includes function converting image data into an image, forming, and outputting it to the recording medium. An auxiliary equipment includes a positioning circuit that computes a geographic coordinates of a reception point by receiving a radio wave signal for positioning. Only if located in a designated range memorized in the nonvolatile memory circuit, performing of the plurality of processing capabilities is permitted.

7 Claims, 7 Drawing Sheets

(56) References Cited

U.S. PATENT DOCUMENTS

| | | | |
|---|---|---|---|
| 8,879,115 B2* | 11/2014 | Harano | 358/1.5 |
| 8,885,216 B2* | 11/2014 | Ishitoya et al. | 358/1.9 |
| 8,970,889 B2* | 3/2015 | Sako | 358/1.15 |
| 9,002,641 B2* | 4/2015 | Showering | 701/469 |
| 2008/0291084 A1* | 11/2008 | Thierry | 342/357.14 |
| 2011/0235083 A1* | 9/2011 | Suzuki | 358/1.14 |
| 2013/0027737 A1* | 1/2013 | Suzuki | 358/1.14 |
| 2014/0247467 A1* | 9/2014 | Kato | 358/1.15 |
| 2015/0062629 A1* | 3/2015 | Tamura | 358/1.15 |
| 2015/0124133 A1* | 5/2015 | Kawazu et al. | 348/296 |

* cited by examiner

| 36: NONVOLATILE MEMORY CIRCUIT ||||
| --- | --- | --- | --- |
| MEMORY ADDRESS | DATA (CONTENTS) |||
| 0000 | PROGRAM CODE |||
| 0100 | POSITION INFORMATION INACCURATE PLUG |||
| 0200 | IDENTIFICATION SIGN OF PRESENT IMAGE FORMING APPARATUS (1a) |||
| 0300 | IDENTIFICATION SIGN OF CONTROL APPARATUS (7a) |||
| 0400 | DESIGNATED RANGE 53a (1) | | LATITUDE |
| | | | LONGITUDE |
| | | | RADIUS r |
| 0700 | DESIGNATED RANGE 53a (2) | | LATITUDE |
| | | | LONGITUDE |
| | | | RADIUS r |
| 1000 | DESIGNATED RANGE 53b | DESIGNATED POINT 53b-1 (1) | LATITUDE |
| | | | LONGITUDE |
| | | ⋮ | |
| | | DESIGNATED POINT 53b-4 (1) | LATITUDE |
| | | | LONGITUDE |
| 1800 | DESIGNATED RANGE 53b | DESIGNATED POINT 53b-1 (2) | LATITUDE |
| | | | LONGITUDE |
| | | ⋮ | |
| | | DESIGNATED POINT 53b-5 (2) | LATITUDE |
| | | | LONGITUDE |
| 2600 | DESIGNATED RANGE 53c | DESIGNATED POINT 53c-1 (1) | LATITUDE |
| | | | LONGITUDE |
| | | | ABOVE SEA LEVEL |
| | | ⋮ | |
| | | DESIGNATED POINT 53c-10 (1) | LATITUDE |
| | | | LONGITUDE |
| | | | ABOVE SEA LEVEL |
| 5600 | DESIGNATED RANGE 53c | DESIGNATED POINT 53c-1 (2) | LATITUDE |
| | | | LONGITUDE |
| | | | ABOVE SEA LEVEL |
| | | ⋮ | |
| | | DESIGNATED POINT 53c-8 (2) | LATITUDE |
| | | | LONGITUDE |
| | | | ABOVE SEA LEVEL |
| 8000 | IMAGE DATA STORAGE AREA |||

IMAGE FORMING APPARATUS THAT PERFORMS FUNCTION RESTRICTION, IMAGE FORMATION METHOD, AND RECORDING MEDIUM

INCORPORATION BY REFERENCE

This application is based on and claims the benefit of priority from Japanese Patent Application No. 2013-227402 filed on Oct. 31, 2013, the contents of which are hereby incorporated by reference.

BACKGROUND

The present disclosure is related with function restriction art when an image forming apparatus is started in the setting position outside a designated range.

In recent years, the flexibility of the setting position of electronic equipment is increased by miniaturizing and saving of weight of the electronic equipment. The portability of the electronic equipment is also increased by power-saving ability of the electronic equipment. Then, as an example about an anxious matter, an unauthorized use of the electronic equipment and an illegal act that uses electronic equipment may occur.

As the electronic equipment, a copying machine, and an MFP (Multi Function Peripheral,) which has read, transmission and reception, and the print function for the manuscript exist. When the copying machine and the MFP are installed in the monitored range by an administrator, the deterrent to an unauthorized use can be expected. However, the portability of the copying machine or the MFP increases, and when it can leave easily from the monitored range by the administrator, the surveillance to the unauthorized use of the copying machine or the MFP will become difficult.

There is a typical printer and a printing execution apparatus that have high convenience and can correspond to management of the printer in a large-scale network, especially modification of the position of the printer flexibly. The printer recognizes a geographical installed position itself, and the computer that instructs printing specifies the printer to be printed by the position information of the printer. Thereby, a user can print with the printer of a desired position at any time.

Also, there is a typical data processing apparatus that can prevent choosing carelessly the apparatus in case that the apparatus separated distantly on a network is chosen from a user. The data processing apparatus can ensure renewal of the physical location information on the apparatus currently used in the case of transfer of the apparatus.

Also, a typical image forming apparatus detects an incorrect movement place of the apparatus and can prevent an unauthorized use. The image forming apparatus acquires installation position information from an external location acquiring apparatus and compares the acquisition result with a proper installation position information stored on nonvolatile memory. If the difference between installation position information is not settled in a predetermined error range, it is judged as the unauthorized use of the apparatus.

SUMMARY

The image forming apparatus of the present disclosure is an image forming apparatus that includes an image output part, a communication part, and a main control part. The image output part forms and outputs an image on a recording medium. The communication part transmits and receives image data. The main control part contains a nonvolatile storage part and a processing part. The nonvolatile storage part has a plurality of storage areas that includes an area to memorize the image data. The processing part enables to perform a plurality of processing capabilities. The processing capability includes function to convert the image data into the image, form and output it on the recording medium. The image forming apparatus of the present disclosure has an auxiliary part. The auxiliary part includes a positioning part that computes geographic coordinates of a reception point by receiving radio wave signals for positioning. In the plurality of storage areas of the nonvolatile storage part, one or more geographical designated ranges that can permit performing of the plurality of processing capabilities are memorized.

An image formation method of the present disclosure is an image formation method performed by an image forming apparatus including a image output part, a communication part, and a main control part. The image output part forms and outputs an image on a recording medium. The communication part transmits and receives image data. The main control part contains a nonvolatile storage part and a processing part. The nonvolatile storage part has a plurality of storage areas that includes an area to memorize the image data. The processing part enables to perform a plurality of processing capabilities. The processing capability includes a function converting the image data into the image, forming and outputting on the recording medium. In the image formation method of the present disclosure, geographic coordinates of a reception point are computed by receiving radio wave signals for positioning. Also, one or more geographical designated ranges that can permit performing of the plurality of processing capabilities are memorized in the plurality of storage areas of the nonvolatile storage part.

The recording medium of the present disclosure is a non-transitory computer-readable recording medium that memorized an image formation program executed by an image forming apparatus including an image output part, a communication part, and a main control part. The image output part forms and outputs an image on a recording medium. The communication part transmits and receives image data. The main control part contains the nonvolatile storage part and the processing part. In the nonvolatile storage part has a plurality of storage areas including an area to memorize the image data. The processing part enables to perform a plurality of processing capabilities. The processing capability includes a function converting the image data into the image, forming and outputting on the recording medium. The program memorized by the recording medium receives the radio wave signal for positioning to the image forming apparatus, and makes it compute the geographic coordinates of the reception point. Also, one or more geographical designated ranges that can permit performing of the plurality of processing capabilities are memorized in the plurality of storage areas of the nonvolatile storage part.

DETAILED DESCRIPTION

Then, the embodiment of the present disclosure is described in detail with reference to drawings.

Firstly, an image forming apparatus 1 applied with the present disclosure receives a radio wave signal for positioning, and is requisite it on a geographic coordinates (it measures latitude, longitude, and above sea level) of a reception point being computable for it.

Figure 1:
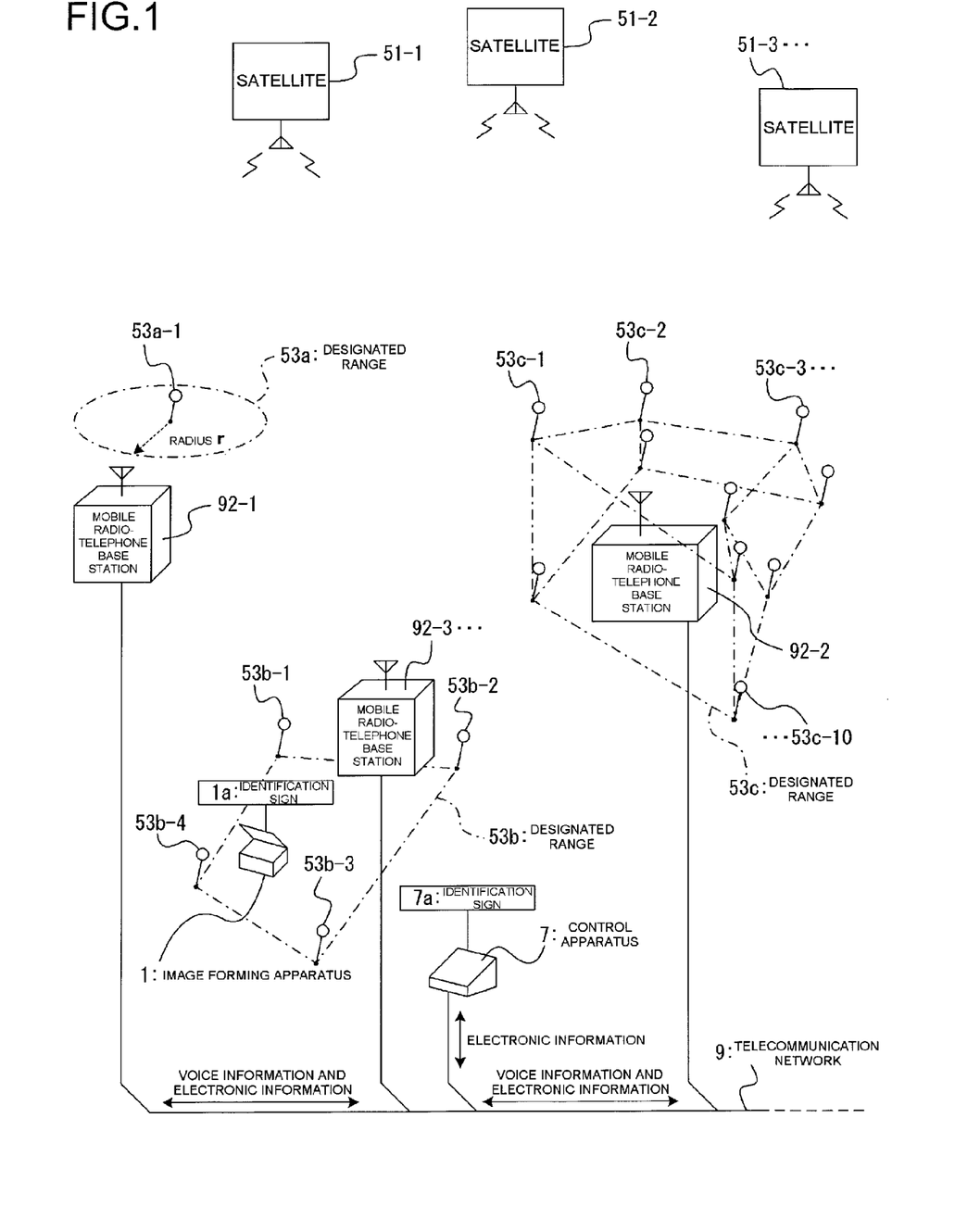
FIG. 1 is a figure explained about positioning and verifying of a designated range in the image forming apparatus applied with the present disclosure.

In the present embodiment, as shown in FIG. 1, radio wave signals that a plurality of satellites 51-1, 51-2, and 51-3 . . . transmits are received. Then, based on the radio wave signals, the latitude and longitude of the image forming apparatus 1 are computed. Also, above sea level, altitude, height, or geoid level (geographic coordinates) is computed if needed. As an example of satellites, GPS (Global Positioning System) satellites are used.

Secondly, a telephone call by voice information, an e-mail by electronic information, or the like are performed.

For the communication line, it requisites that electronic information communication can be performed to the control apparatuses 7, which manages the image forming apparatus 1.

The electronic information communication is performed via mobile radiotelephone base station 92-1, 92-2, and 92-3 . . . connected to telecommunication network 9.

In the present embodiment, as an example, a cellular portable telephone network that can perform an exchange of a telephone call with a sound, an e-mail, or the like, in the time of moving and its base station are used.

In addition, in the control apparatus 7, a unique identification sign 7a (an e-mail address, IP address, or the like) for identifying a communicative partner in case of transmitting and receiving electronic information in the telecommunication network 9 is assigned. In the image forming apparatus 1, a unique identification sign 1a for identifying a communicative partner in case of transmitting and receiving electronic information in telecommunication network 9 is assigned, similarly.

As refer to FIG. 1, one or more geographical designated ranges will be determined in the present embodiment. Hereafter, "the geographical designated range" is just called a "designated range."

These one or more designated range(s) are memorized in the control apparatus 7, previously. There are some forms in the designated range. As one of forms, a designated range 53a becomes designated point 53a-1 and radius r (about several meters to several ten meters,) which are latitude and longitude of one place. Thereby, the designated range 53a is an area inside of the radius r by the designated point 53a-1.

As another form, a designated range 53b becomes designated point 53b-1, 53b-2, and 53b-3 . . . (53b-4 in FIG. 1,) which are latitudes and longitudes of three or more places. Thereby, the designated range 53b is an area inside of a plane that connects the designated point 53b-1, 53b-2, 53b-3 . . . with a straight line. Thus, a complicated-shaped designated range can be arranged in the designated range 53b.

As another form, a designated range 53c becomes designated point 53c-1, 53c-2, 53c-3, and 53c-4 . . . (53c-10 in FIG. 1,) which are latitudes, longitudes, and above sea levels of four or more places. Thereby, designated range 53c is an area inside of a polygon that is connected in a straight line between the designated point 53c-1, 53c-2, 53c-3, and 53c-4 . . . . In addition, in FIG. 1, a notation is omitted about straight lines in part. In the designated range 53c, in addition to complicated shape, a designated range can also be determined with estimating a floor of a building is at a specific place.

These designated ranges 53a and 53b or 53c can be chosen and determined any one form, and may be determined with combining one or more forms of the plurality of designated ranges.

Further, the mobile radiotelephone base station 92-1, 92-2, 92-3 . . . can be installed inside or outside in any of these designated ranges 53a, 53b or 53c. Also, it can be installed ranging over a boundary of the designated ranges 53a, 53b, or 53c.

Figure 2:
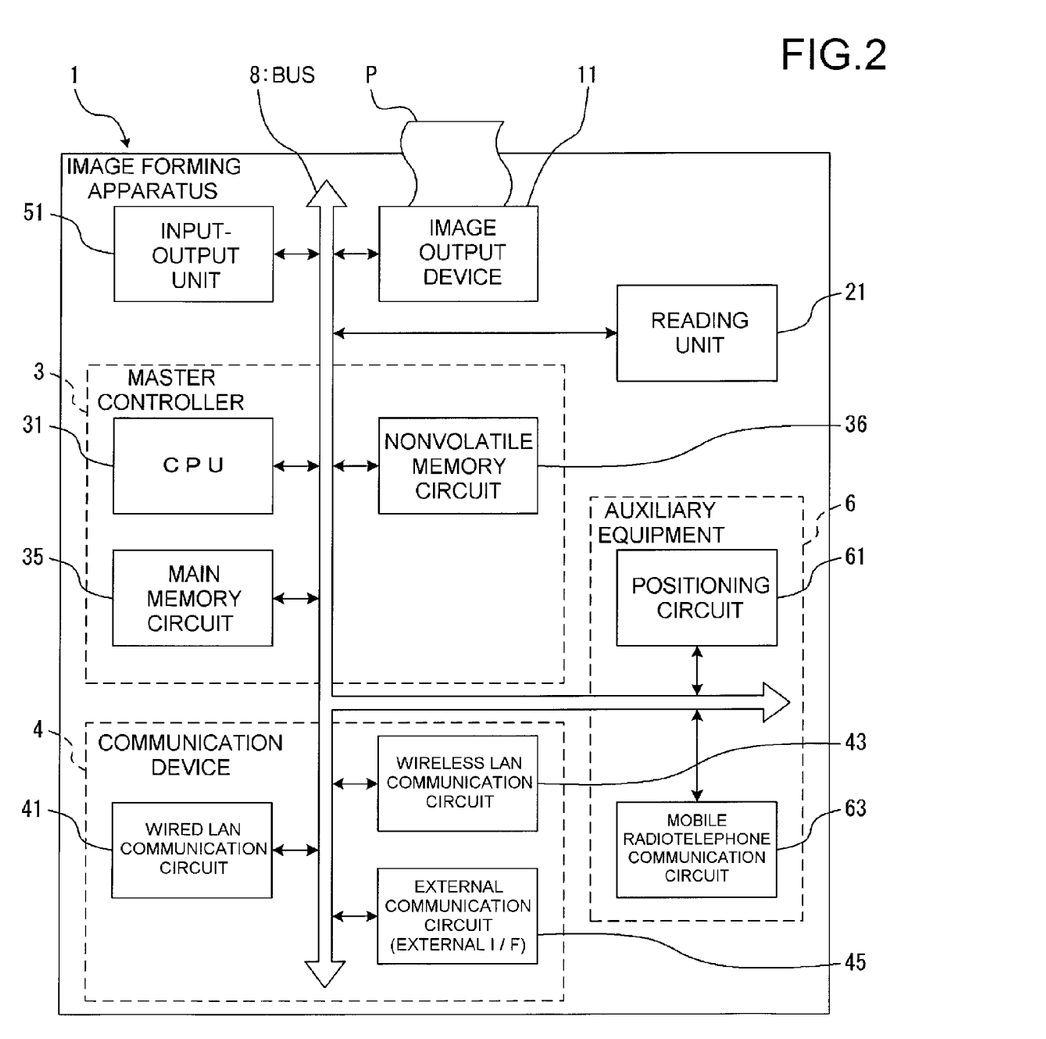
FIG. 2 is a block diagram indicating the composition of the image forming apparatus in the present embodiment.

Then, as refer to FIG. 2, an example of composition of the image forming apparatus 1 is explained. The image forming apparatus 1 of the present embodiment is provided with an image output device 11 (image output part), a reading unit 21 (reading part), a master controller 3 (main control part), a communication device 4 (communication part), and an input-output unit 51 (input-output part). In addition to them, the image forming apparatus 1 has an auxiliary equipment 6 (auxiliary part), which performs a process related to prevention of an unauthorized use of the image forming apparatus 1. In the image forming apparatus 1, these parts are connected to a bus 8.

The master controller 3 includes a CPU (Central Processing Unit) 31 (processing part), a main memory circuit 35, and a nonvolatile memory circuit 36, or the like.

Also, the communication device 4 includes a wired LAN (Local Area Network) communication circuit 41 or a wireless LAN communication circuit 43, which is a communication circuit for connecting with an external communication line, transmitting and receiving image data and a variety of information. Also, the communication device 4 includes a wireless communication circuit in which a protocol differs from these, an external communication circuit (external I/F) 45 for a parallel data bus and a serial data bus, or the like. The auxiliary equipment 6 includes a positioning circuit 61 (positioning part) and a mobile radiotelephone communication circuit 63 (mobile radiotelephone communication part).

Here, general operation of the image forming apparatus 1 is explained. The image forming apparatus 1 reads a manuscript as image data with the reading unit 21. Or, from a processing apparatus, such as a computer (not shown,) text data and image data (these are henceforth just called an "image data") and the instructions information that instructs a various processing to the image data are inputted. A processing unit is connected via the wired LAN communication circuit 41, the wireless LAN communication circuit 43, or the external communication circuit 45.

The image data is stored in an image data storage area (described later) provided in the nonvolatile memory circuit 36 if needed. In addition, the image data is memorized also in the main memory circuit 35. The reason is, in case that output instruction occurs from the input-output unit 51, an above-mentioned computer, or the like, for preparing to rearrange the data suitable in order to form as an image on a surfaces of a recording medium such as a recording paper P. It is also for preparing to form the same image on the surfaces of a plurality of the recording papers, or the like.

The image data rearranged and memorized in the main memory circuit 35 is formed as an image using ink or a toner on the surfaces of a recording paper or the like (succeeded in the process of fixing or the like if needed) by the image output device 11, and it is discharged out of the image forming apparatus 1.

Such operations from the input of such image data to discharge of the recording paper in which the image is formed or the like is carried out by the CPU 31 based on a processing program memorized in the main memory circuit 35. In addition, the processing program is previously memorized as a program code (data) in the nonvolatile memory circuits 36, such as a flash memory. The program code is read from the nonvolatile memory circuit 36 at the time of starting of the image forming apparatus 1 and is expanded in the main memory circuit 35 as a processing program. That is, it is converted from data to a program and is memorized.

The input-output unit 51 includes a liquid crystal panel, a touch panel, or the like. When the input-output unit 51 is operated, an instructions that start reading of a manuscript, forming the image to the recording paper, or the like, are sent to the CPU 31. Also, from the CPU 31, information that shows a state in each part of the image forming apparatus 1 is sent to the input-output unit 51. The information is informed by the input-output unit 51. In addition, an electric power switch (primary power supply switch) of the image forming apparatus 1 may also be provided in the input-output unit 51, for convenience.

In the present embodiment, the positioning circuit 61 receives radio waves from the satellite 51-1, 51-2, and 51-3 . . . (as refer to FIG. 1,) sequentially, and it computes the position of the image forming apparatus 1. The positioning circuit 61 may perform the process without relation to the operation of the CPU 31.

On the other hand, the mobile radiotelephone communication circuits 63 always establishes a communication line with an any of the mobile radiotelephone base station 92-1, 92-2, and 92-3 . . . , and it is standing by. The mobile radiotelephone communication circuit 63 may perform the process without relation to of the operation of the CPU 31. The reason is for starting transmission and reception promptly, when there are instructions of transmission and reception of the electronic information from the CPU 31.

In addition, the wired LAN communication circuit 41, the wireless LAN communication circuit 43, or the external communication circuit 45 may be established the communication line and always be standing by without relation to the operation of the CPU 31. In this case, via any of the above-mentioned wired LAN communication circuit 41, the wireless LAN communication circuit 43, or the external communication circuit 45, which is the communication device 4, it may be in an environment that can perform transmission and reception of the electronic information equivalent to the mobile radiotelephone communication circuit 63.

Figure 3:
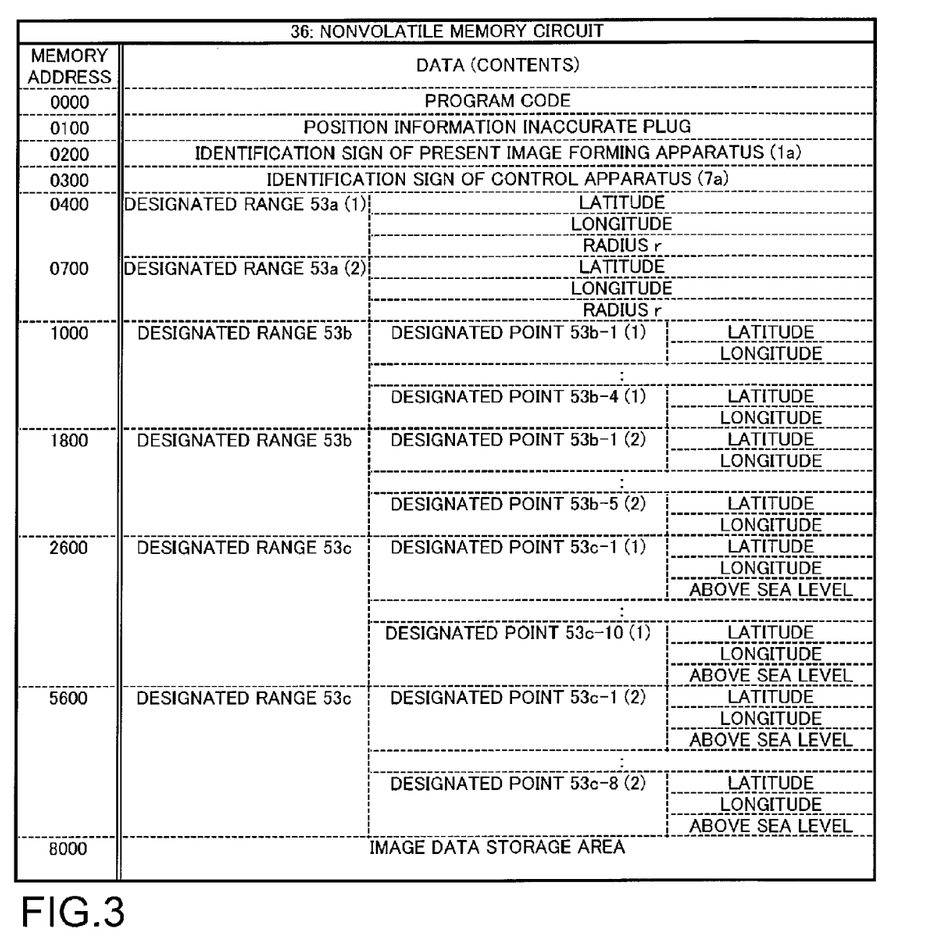
FIG. 3 is a figure (memory map) showing an area allocation of a nonvolatile memory circuit in the present embodiment.

In the nonvolatile memory circuit 36, various information in addition to the above-mentioned program code is memorized, and thus some storage areas are included. An example of such a storage area provided in the nonvolatile memory circuit 36 is shown in FIG. 3. In addition, a sequence of numbers of a memory address, as shown in FIG. 3, indicates a start address of each storage area for convenience.

According to the present embodiment, data will be read from an upper row of the nonvolatile memory circuit 36 at a time of starting of the image forming apparatus 1. In this case, in an area of a memory address [0000] of the upper row of the nonvolatile memory circuit 36, a program code of a processing program of the CPU 31 expanded by the main memory circuit 35 is memorized.

An area of the following memory address [0100] is an area of a position information inaccurate flag. According to the present embodiment, if a position of the image forming apparatus 1 computed by the positioning circuit 61 has deviated from the designated range, the position information inaccurate flag is set and memorized in the nonvolatile memory circuit 36.

Also, in an area of a memory address [0200], the identification sign 1*a* of the present image forming apparatus 1 at the time of transmitting and receiving the electronic information via the telecommunication network 9 is memorized. In an area of a memory address [0300], the identification sign 7*a* of the control apparatus 7 is memorized, similarly.

Further, in the next area, there is an area that memorizes data for determining the designated range 53*a*, the designated range 53*b*, and the designated range 53*c*. The size of this area is according to a form of a designated range, or a number of designated points.

For example, the data of designated range 53*a* is memorized in the area of the memory address [0400]. The data of designated range 53*a* is a set of three elements, which are latitude, longitude, and radius r. In an area of a memory address [0400], a first set of the designated range 53*a* is memorized. In an area of a memory address [0700], a second set of the designated range 53*a* is memorized.

Data of designated range 53*b* is memorized in an area of a memory address [1000]. The data of the designated range 53*b* is a set of two elements, which are latitude and longitude, for the designated point 53*b*-1 and 53*b*-2 . . . , respectively. In an area of a memory address [1000], a first set of the designated range 53*b* is memorized. In an area of a memory address [1800], a second set of the designated range 53*b* is memorized.

The data of designated range 53*c* is memorized in the area of the memory address [2600]. The data of designated range 53*c* is a set of three elements, which are latitude, longitude, and above sea level for designated point 53*c*-1 and 53*c*-2 . . . , respectively. In an area of a memory address [2600], a first set of the designated range 53*c* is memorized. In an area of a memory address [5600], a second set of the designated range 53*c* is memorized.

After a memory address [8000], there is an image data storage area. The image data storage area is used for a purpose of a document box or the like. After a manuscript is read with the reading unit 21, the document box keeps storing until the image data is output to the image output device 11 or the external computer. If a power supply of the image forming apparatus 1 is disconnected, the document box may continue storing the image data.

Among each area mentioned above, the data from the area of the memory address [0200] to the area of the memory address [5600] are memorized when the image forming apparatus 1 is used for the first time. In this case, the image forming apparatus 1 is connected to the control apparatus 7 via the communication device 4, and the designated range information previously set in the control apparatus 7 is transmitted and memorized.

Therefore, especially for the data of the area from the memory address [0400] to the area of the memory address [5600], a troublesome operation of memorizing the nonvolatile memory circuit 36 for each image forming apparatus 1 is unnecessary. Also, in a case that some of the designated range is changed, even if the user of this image forming apparatus 1 does not become aware the situation, it is also possible to rewrite the information on the nonvolatile memory circuit 36 from control apparatus 7.

Figure 4:
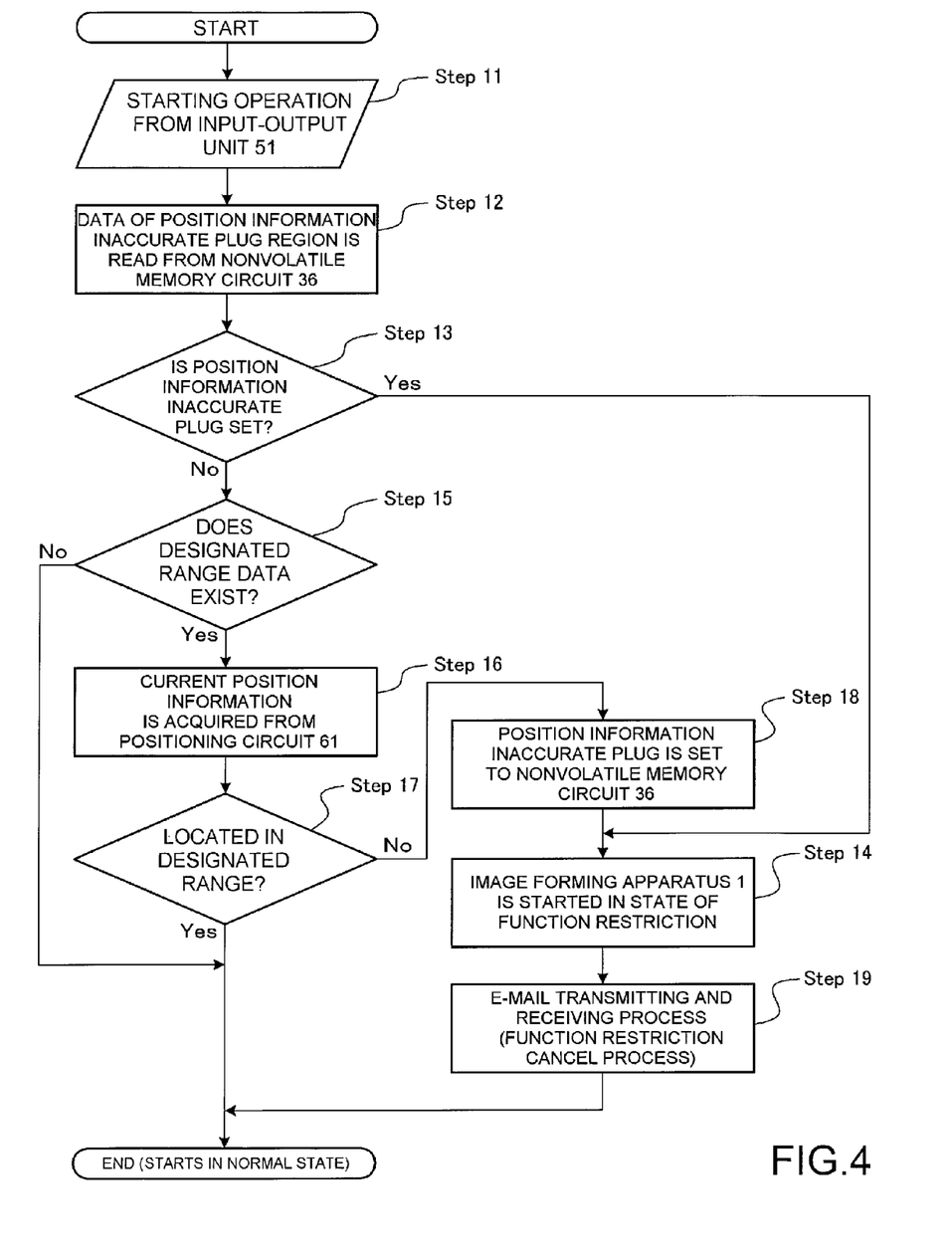
FIG. 4 is a flow chart which indicates the flow of the process at the time of starting of the image forming apparatus in the present embodiment.

Then, the activation procedure of image forming apparatus 1 of the present embodiment is explained as refer to FIG. 4. Firstly, in Step 11, operation for starting of the image forming apparatus 1 is performed by an electric power switch provided in the input-output unit 51. Then, a program code memorized in the nonvolatile memory circuit 36 is expanded to the main memory circuit 35, and the CPU 31 starts a process.

In Step 12, the CPU 31 reads the data of a position information inaccurate flag area from the nonvolatile memory circuit 36. As Step 13, the CPU 31 judges whether or not the position information inaccurate flag is set from data read from the nonvolatile memory circuit 36.

If the position information inaccurate flag set in this Step 13, the image forming apparatus 1 is started in the state of function restriction as Step 14. In Step 14, it processes for transmitting and receiving information in a form of an e-mail to control apparatus 7 about the state of the function restriction (function restriction cancel process,) and it progresses to Step 19. In addition, the function restriction and the function restriction cancel process are described later.

On the other hand, if the position information inaccurate flag does not set in Step 13, as Step 15, it is verified whether or not the designated range data exist in the nonvolatile memory circuit 36.

If the designated range data does not exist in Step 15, it judges not necessary to impose on the function restriction or the like and starts the image forming apparatus 1 in a normal state.

On the other hand, if the designated range data exist in Step 15, as Step 16, the CPU 31 acquires the current position information from the positioning circuit 61.

In the following Step 17, the CPU 31 judges whether or not the current position information acquired from the positioning circuit 61 corresponds inside the designated range memorized in the nonvolatile memory circuit 36. For the current position information, it is used latitude, longitude, and above sea level if needed. Also, the CPU 31, if two or more sets of the designated ranges are memorized, judges whether or not it corresponds inside of any set of the designated range.

In Step 17, if the current position information acquired from the positioning circuit 61 corresponds inside of any of the designated range memorized in the nonvolatile memory circuit 36, the image forming apparatus 1 is started without imposing the function restriction or the like.

On the other hand, in Step 17, if the current position information acquired from the positioning circuit 61 corresponds neither inside of the designated range memorized in the nonvolatile memory circuit 36, as Step 18, the position information inaccurate flag is set to the nonvolatile memory circuit 36, and it progresses to Step 14.

In this Step 14, as mentioned above, the image forming apparatus 1 is started in the state of the function restriction, the information about the function restriction being performed is transmitted to the control apparatus 7 by e-mail, and it progresses to the process (Step 19), which gets an e-mail of use permission from the control apparatus 7.

Here, a process related to e-mail transmission and reception in Step 19 is explained. In Step 19, firstly, a process that waits for the reply of electronic information from the control apparatus 7 is performed. If information about use permission even if deviated from all of one or more the designated ranges is included in the electronic information replied from the control apparatus 7, a process that cancels the predetermined restriction imposed on the performing of the plurality of the processing capabilities is performed.

If the information about use permission even if deviated from all of one or more designated ranges is not included in the electronic information replied from the control apparatus 7, a process that transmits the electronic information to the control apparatus repeatedly for every fixed time is performed.

Figure 5:
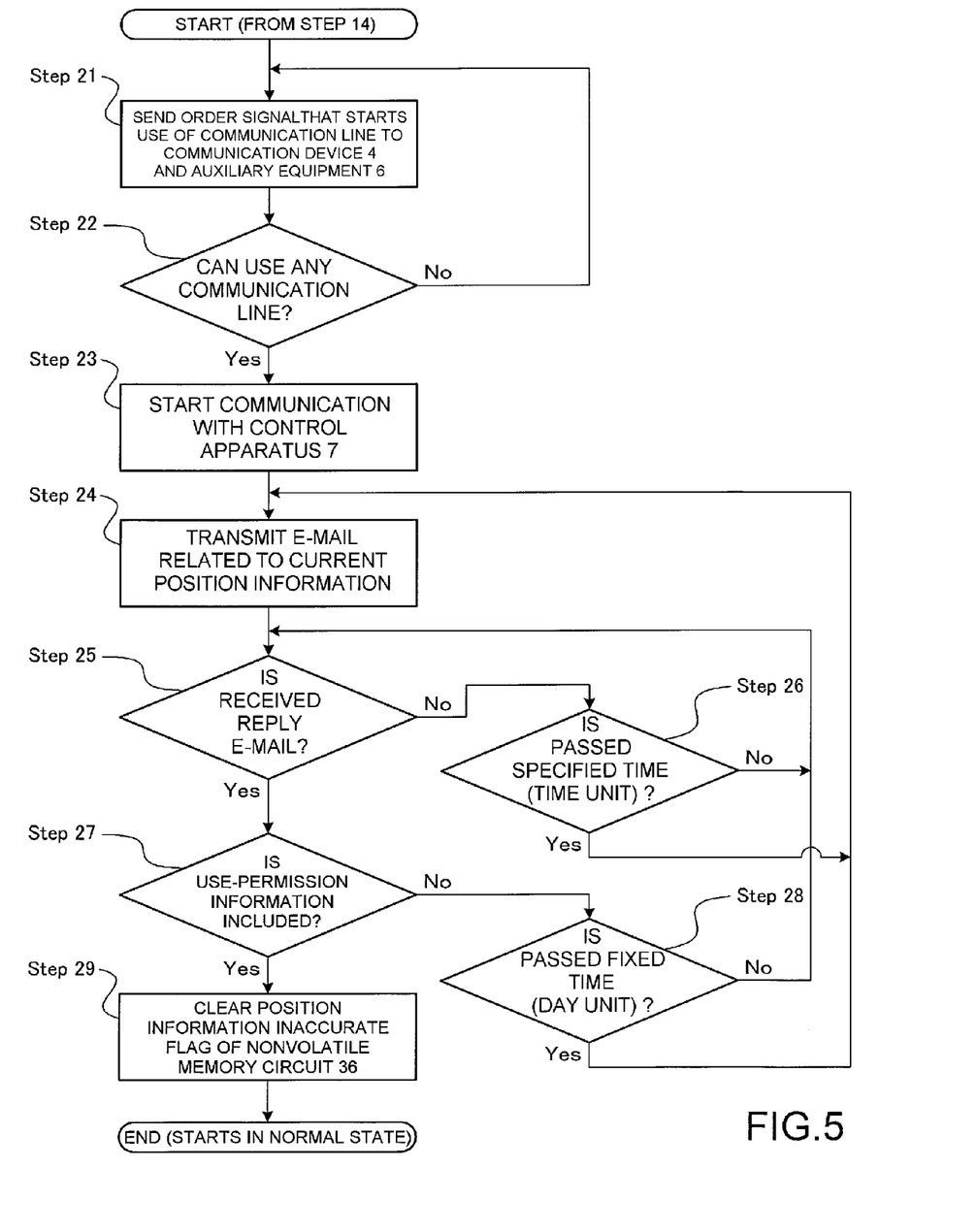
FIG. 5 is a flow chart that shows a flow of transmission and reception of an e-mail for obtaining use permission of the image forming apparatus in the present embodiment.

This Step 19 performs a process as shown in FIG. 5.

As refer to FIG. 5, in this process, firstly, the order signal that starts use of a communication line is sent to each communication circuit, which configures the communication device 4 and the auxiliary equipment 6, and it is confirmed whether any communication line is usable (Step 22). Here, if neither of the communication circuits is usable in the communication line, it returns to the Step 21 and re-sends the order signal that starts use of the communication line.

On the other hand, if any one of the communication line is usable, communication with the control apparatus 7 is started via the usable communication circuit (Step 23).

If communication with the control apparatus 7 is started, in Step 24, an e-mail is transmitted to the control apparatus 7. If the current position is able to be acquired from the positioning circuit 61, the current position information is included in the e-mail transmitted here. If the current position is not able to be acquired, the information that the current position is not able to be acquired, or the like, is included in this e-mail.

Also, the position information inaccurate flag is included in the e-mail. The position information inaccurate flag is electronic information that includes information of the image forming apparatus 1 being located outside the geographical designated range to permit performing of the plurality of the processing capabilities and the predetermined restriction being imposed on performing of the plurality of the processing capabilities.

After transmitting the e-mail to the control apparatus 7, in Step 25, the CPU 31 confirms the reply electronic mail from the control apparatus 7. Here, if reception of the reply electronic mail cannot be confirmed, it returns to Step 25 repeatedly and confirms reception until a specified time elapses (Step 26). Then, after the specified time elapse, it returns to Step 24 and transmits an e-mail again. In addition, the specified time here is comparatively short time, such as several hour units. That is, the specified time mentioned here differs from a fixed time, which is described later in Step 28.

On the other hand, if the reception of the reply electronic mail from the control apparatus 7 is confirmed in Step 25, in Step 27, it is verified whether or not the use-permission information of the image forming apparatus 1 is included in this reply e-mail.

If, in the reply electronic mail from the control apparatus 7 in Step 27, the use-permission information, which permits use of image forming apparatus 1 even if deviated from all of one or more the designated ranges, is not included, it returns to Step 25 repeatedly until the fixed time passes (Step 28). Then, after progress for a fixed time, it returns to Step 24 and transmits an e-mail again. The fixed time mentioned here is comparatively a long period of time, such as several day unit, and the image forming apparatus 1 will be in the function restriction state in the meantime. That is, the fixed time here is longer than the above-mentioned specified time in Step 26.

On the other hand, if, in the reply electronic mail from the control apparatus 7 in Step 27, the use-permission information, which permits use of image forming apparatus 1 even if deviated from all of one or more the designated ranges, is included, the position information inaccurate flag of the nonvolatile memory circuit 36 is cleared (Step 29). Then, the function restriction of the image forming apparatus 1 is canceled, and it starts in a normal state.

Figure 6A:
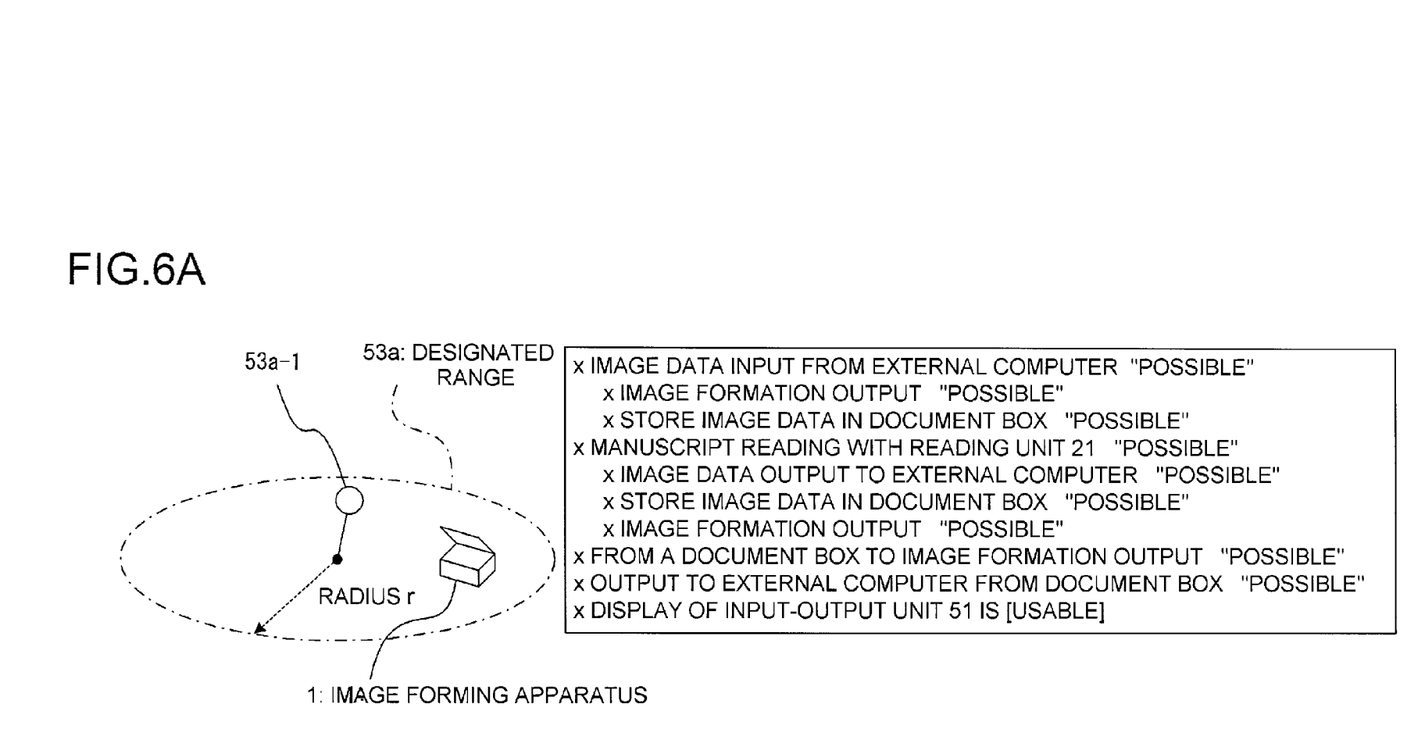
FIG. 6A is a figure showing an example of a relationship between a position and a function restriction to a designated range of the image forming apparatus applied with the present disclosure.
Figure 6B:
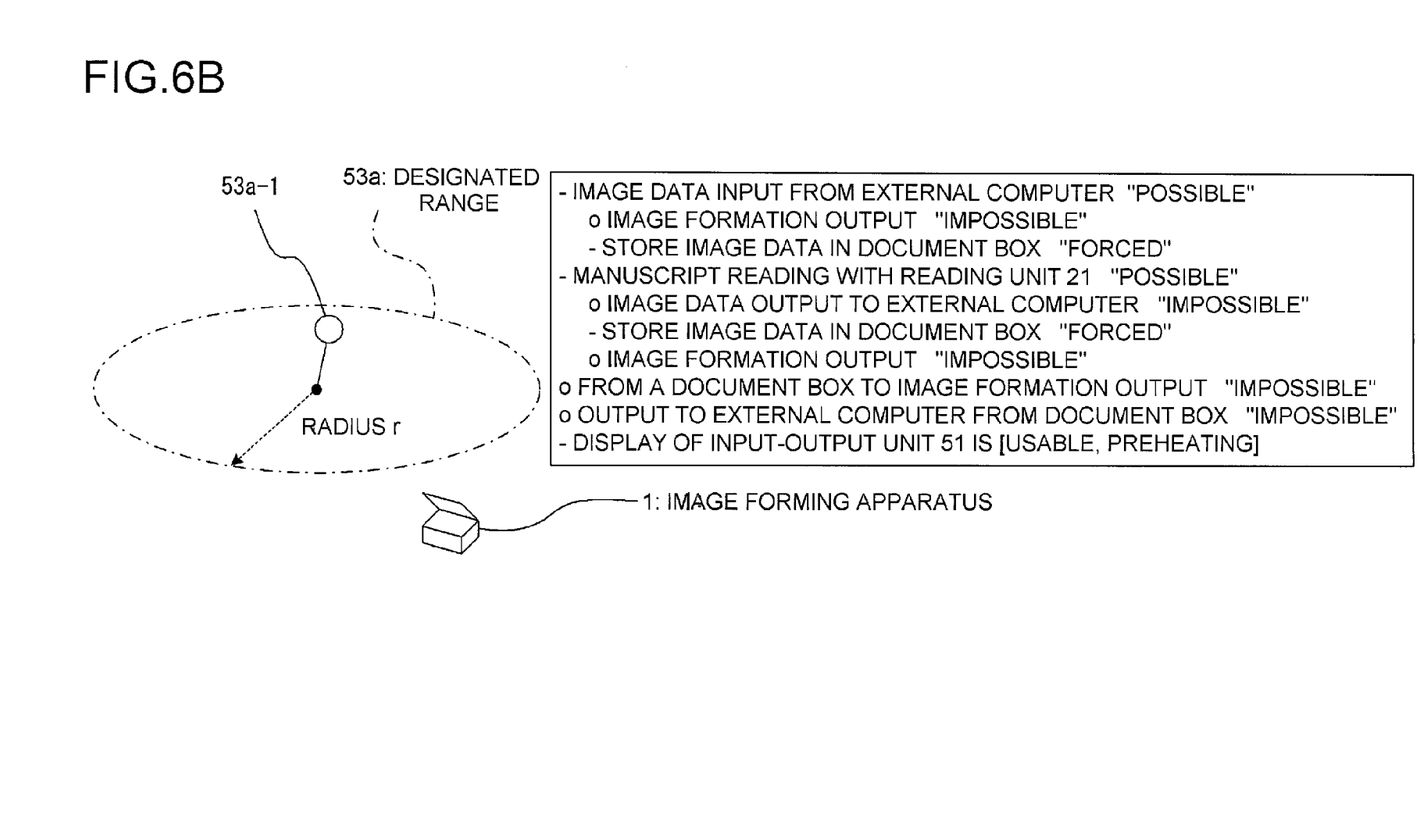
FIG. 6B is a figure showing an example of a relationship between the position and the function restriction to the designated range of the image forming apparatus applied with the present disclosure.

Here, the function restriction is explained as refer to FIGS. 6A and 6B. FIG. 6A indicates a case where the image forming apparatus 1 is located inside the designated range 53*a*. FIG. 6B shows a case that the image forming apparatus 1 is deviated from the designated range 53*a* and the designated range data other than the designated range 53*a* is not memorized in the nonvolatile memory circuit 36.

In FIG. 6A, since the image forming apparatus 1 is located inside the designated range 53*a*, the function restriction is not imposed. Therefore, the input of the external computer to the image data is possible. It is also possible to form and output the image from the image output device 11 based on this image data. It is also possible to store the image data in the document box.

Also, reading of the manuscript is possible with the reading unit 21. It is also possible to output to the external computer by making the read image into the image data. It is also possible to store the image data in the document box. It is also possible to form and output the image from the image output device 11 based on the image data.

Further, it is also possible to form and output the image from the image output device 11 based on the image data of the document box. It is also possible to output the image data to the external computer from the document box. The display of the input-output unit 51 at this time is [Usable].

On the other hand, in FIG. 6B, since the image forming apparatus 1 is located outside of the designated range 53*a*, the function restriction is imposed. The function restriction is a measure for preventing, such as, in case that image forming apparatus 1 is brought out and separated from appropriate management environment, an image formation (namely, printing) is performed illegally, an illegal copy is performed, or information remaining in the image forming apparatus 1 is extracted. Also, the function restriction is a measure for making it easy to grasp what kind of unauthorized use to have been done.

Accordingly, in FIG. 6B, the input of the external computer to the image data is possible. However, it is impossible to form and output the image from the image output device 11 based on this image data, and the inputted image data is stored in the document box.

Also, reading of a manuscript is possible with the reading unit 21. However, it is also impossible to output to the external computer by making the read image into the image data. It is also impossible to output the read image to the image output device 11. The image data of the read image is stored in the document box.

Further, it is impossible to form and output the image from the image output device 11 based on the image data of the document box. It is also impossible to output the image data to the external computer from the document box. These are the function restriction.

The display of the input-output unit 51 at this time is [usable]. However, for an image forming apparatus that processes heat fixing of the image, it displays on the input-output unit 51 that [under preheating] instead of [usable] or combining with [usable] and [under preheating]. That is, the state of the function restriction is not displayed, especially.

The reason of the behavior is, if the state of the function restriction is indicated, the possibility increases that an unauthorized use person destroys the image forming apparatus 1 and extracts the image data remaining inside it. Thus, even if it is in a state that function restriction is imposed on and cannot be used some function, by pretending as it being under preheating or adjusting, destroying the image forming apparatus 1 and being extracted the image data are preventable.

Thus, according to the present disclosure, it is distinguished whether the image forming apparatus exists in the plurality of the geographical designated range that is previously set as this image forming apparatus. If it does not exist, since a function is restricted until the permission from the control apparatus being obtained, the unauthorized use of the image forming apparatus can be prevented.

In addition, the plurality of the geographical designated range can be set up. Accordingly, even if it transmits the same setting to two or more image forming apparatuses simultaneously, each of them can start normally in case that any designated range is corresponded to. That is, since it is not necessary to set individually for the plurality of image forming apparatuses, a burden of administrator can also be reduced.

According to a case of a typical image forming apparatus, for example, if electronic equipment is brought out to external area, it is possible to notify to an administrator. However, a monitored range must be set to each the electronic equipment or the like, a complicated process is required for effective use. Also, the typical image forming apparatus cannot prevent being illegally used the brought-out electronic equipment.

The present disclosure is accomplished in view of the point. The image forming apparatus of the present disclosure can, when brought out from the setting position of a designated range, prevent outputting illegally the image data that forms and outputs an image illegally, reading a manuscript image illegally, or outputting the image data stored inside.

In addition, it is clear that the present disclosure is not limited to each of the above-mentioned embodiment, but each embodiment may be suitably changed within the limits of the technical idea of the present disclosure.

For example, about the above-mentioned contents of function restriction, in the present disclosure, the restricted function and item are not limited to the above-mentioned description. The contents of function restriction can be arbitrarily set up within the limits of the function that can be carried and controlled to the image forming apparatus. Also, the item of the function to cancel restriction may be provided in the data of the designated range memorized in the nonvolatile memory circuit. Thereby, for each designated range, a different restriction of the function is canceled partially is also possible.

The radio wave signal for positioning is not limited the signal transmitted from a GPS Satellite.

The radio wave signal transmitted from other positioning satellites, a commercial satellite having a protocol for positioning, a technology satellite, or a positioning apparatus, may be used.

A portable electronic terminal apparatus having positioning function based on various radio wave signals can be used for the auxiliary equipment that has the positioning circuit and the mobile radiotelephone communication circuit.

Needless to say, for the above-mentioned members, a number, a position, shape, or the like, are not limited to the above-mentioned embodiment. Thus, when carrying out the present disclosure, it can be used a suitable number, a position, shape, or the like. Furthermore, in each figure, identical numbers are given to the identical component.

What is claimed is:

1. An image forming apparatus having
a communication part that transmits and receives image data with an external communication line,
a reading part that reads a manuscript image as image data, an image output part that forms and outputs an image on a recording medium from:
  the image data received by the communication part, and/or
  the image data read by the reading part,
a nonvolatile storage part that has a plurality of storage areas including an area to memorize the image data received by the communication part and/or memorize the image data read by the reading part,
a main control part including a processing part that performs a plurality of processing capabilities including a processing capability to convert the image data received by the communication part and/or the image data read by the reading part into the image, to form, and to output the image on the recording medium,
an auxiliary part including a positioning part that computes a geographic coordinates of a reception point by receiving a radio wave signal for positioning, and
in the plurality of storage areas of the nonvolatile storage part, one or more geographical designated ranges that can permit performing the plurality of processing capabilities are memorized,
wherein the processing part, in case that the geographic coordinates are un-computable by the positioning part, or in case that the geographic coordinates computed by the positioning part are deviated from the one or more geographical designated ranges memorized in the plurality of storage areas of the nonvolatile storage part, imposes a predetermined restriction on the performing of the plurality of processing capabilities including the processing capability to convert the image data into the image, to form, and to output on the recording medium, and
wherein the processing part has:
  a processing capability that reads the manuscript image by the reading part and converts into image data;
  a processing capability that outputs the image data, which is converted from the read manuscript image, via the communication part;
  a processing capability that memorizes the image data to the nonvolatile storage part; and
  a processing capability that outputs the image data, which is memorized in the nonvolatile storage part, via the communication part;
wherein, in case that the geographic coordinates are un-computable by the positioning part, or in case that the geographic coordinates computed by the positioning part are deviated from the one or more geographical designated range memorized in the plurality of storage areas of the nonvolatile storage part, function restriction of the image forming apparatus is imposed such that:
  the processing capability that outputs the image data, which is converted from the read manuscript image, via the communication part is stopped;
  the processing capability that outputs the image data, which is memorized in the nonvolatile storage part, via the communication part is stopped,
  forming and outputting the image from the image output part based on the image data is impossible,
  receiving the image data from the external communication line is possible, and
  reading of the manuscript image with the reading part is possible.

2. The image forming apparatus according to claim 1, wherein
the auxiliary part has
  a mobile radiotelephone communication part that performs electronic information communication with any of one or more mobile radiotelephone base stations connected to the telecommunication network performing a sound or the electronic information communication; and
the processing part,
when the predetermined restriction is imposed on performing of the plurality of processing capabilities, electronic information including information, which the predetermined restriction is imposed on performing of the processing capability, transmits to a controlling device connected to the telecommunication network and waits a reply for the electronic information from the controlling device; and
in case that the information of permitting to use even if deviated from all of one or more of the designated ranges is included in the reply for the electronic information, the predetermined restriction imposed on performing of the plurality of processing capabilities is canceled.

3. The image forming apparatus according to claim 2, wherein
the processing part,
in case that the reply for the electronic information from the controlling device is un-receivable, the electronic information is repeatedly transmitted to the controlling device for every predetermined time; and
in case that the information of permitting to use even if deviated from all of one or more of the designated ranges is not included in the reply for the electronic information, the electronic information is repeatedly transmitted to the controlling device for every fixed time.

4. The image forming apparatus according to claim 1, further comprising
an input-output part that is inputted an execution instruction of a various processing to the processing part and outputs the information related to the executed situation of a various processing by the processing part; and
the processing part, even if the predetermined restriction is imposed on performing of the plurality of processing capabilities, to the input-output part, only displays information that is not related to the restriction of performing.

5. An image formation method performed by an image forming apparatus having
an image output part that forms and outputs an image on a recording medium,
a communication part that transmits and receives image data with an external communication line,
a reading part that reads a manuscript image as an image data,
an image output part that forms and outputs an image on a recording medium from:
  the image data received by the communication part, and/or
  the image data read by the reading part,
a nonvolatile storage part that has a plurality of storage areas including an area to memorize the image data received by the communication part and/or memorize the image data read by the reading part, and
a main control part including a processing part that performs a plurality of processing capabilities including a processing capability to convert the image data received by the communication part and/or the image data read by the reading part into the image, to form, and to output the image on the recording medium, wherein the processing part has:
  a processing capability that reads the manuscript image by the reading part and converts into image data;

a processing capability that outputs the image data, which is converted from the read manuscript image, via the communication part;
a processing capability that memorizes the image data to the nonvolatile storage part; and
a processing capability that outputs the image data, which is memorized in the nonvolatile storage part, via the communication part
wherein the image formation method comprises the steps of:
computing a geographic coordinates of a reception point by receiving a radio wave signal for positioning; and
memorizing one or more geographical designated ranges that can permit performing of the plurality of processing capabilities to the plurality of storage areas of the nonvolatile storage part,
imposing, in case that the geographic coordinates are uncomputable by the positioning part, or in case that the geographic coordinates computed by the positioning part are deviated from the one or more geographical designated range memorized in the plurality of storage areas of the nonvolatile storage part, a predetermined restriction on the performing of the plurality of processing capabilities including the processing capability to convert the image data into the image, to form, and to output on the recording medium,
imposing, in case that the geographic coordinates are uncomputable by the positioning part, or in case that the geographic coordinates computed by the positioning part are deviated from the one or more geographical designated range memorized in the plurality of storage areas of the nonvolatile storage part, a function restriction of the image forming apparatus, wherein imposing the function restriction comprises:
stopping the processing capability that outputs the image data, which is converted from the read manuscript image, via the communication part,
stopping the processing capability that outputs the image data, which is memorized in the nonvolatile storage part, via the communication part,
making impossible forming and outputting the image from the image output part based on the image data,
making possible receiving the image data from the external communication line, and
making possible reading of the manuscript image with the reading part.

6. A non-transitory computer-readable recording medium memorizing an image formation program executed by an image forming apparatus having:
a communication part that transmits and receives image data with an external communication line,
a reading part that reads a manuscript image as an image data,
an image output part that forms and outputs an image on a recording medium from:
the image data received by the communication part, and/or
the image data read by the reading part,
a nonvolatile storage part that has a plurality of storage areas including an area to memorize the image data received by the communication part and/or memorize the image data read by the reading part, and
a main control part including a processing part that performs a plurality of processing capabilities including a processing capability to convert the image data received by the communication part and the image data read by the reading part into the image, to form, and to output the image on the recording medium,
a processing capability that reads the manuscript image by the reading part and converts into image data;
a processing capability that outputs the image data, which is converted from the read manuscript image, via the communication part;
a processing capability that memorizes the image data to the nonvolatile storage part; and
a processing capability that outputs the image data, which is memorized in the nonvolatile storage part, via the communication part, wherein the program makes the image forming apparatus:
compute a geographic coordinates of a reception point by receiving a radio wave signal for positioning, and
memorize one or more geographical designated ranges that can permit performing of the plurality of processing capabilities to the plurality of storage areas of the nonvolatile storage path,
impose, in case that the geographic coordinates are uncomputable by the positioning part, or in case that the geographic coordinates computed by the positioning part are deviated from the one or more geographical designated range memorized in the plurality of storage areas of the nonvolatile storage part, a predetermined restriction on the performing of the plurality of processing capabilities including the processing capability to convert the image data into the image, to form, and to output on the recording medium,
impose, in case that the geographic coordinates are uncomputable by the positioning part, or in case that the geographic coordinates computed by the positioning part are deviated from the one or more geographical designated ranges memorized in the plurality of storage areas of the nonvolatile storage part, function restriction of the image forming apparatus, wherein the function restriction:
stops the processing capability that outputs the image data, which is converted from the read manuscript image, via the communication part,
stops the processing capability that outputs the image data, which is memorized in the nonvolatile storage part, via the communication part,
makes impossible the forming and outputting of the image from the image output part based on the image data,
makes possible the receiving of the image data from the external communication line makes possible, and
makes possible the reading of the manuscript image with the reading part.

7. The image forming apparatus according to claim 4, in case of the function restriction, the input-output part displays that the image forming apparatus is usable and/or under preheating.

* * * * *